(12) United States Patent
Switzer et al.

(10) Patent No.: US 8,123,168 B2
(45) Date of Patent: Feb. 28, 2012

(54) WINDOW ASSEMBLY AND METHOD FOR A MOBILE PLATFORM

(75) Inventors: Lon E Switzer, Marysville, WA (US); Robert D Dixon, Everett, WA (US); Fred P Seibert, Seattle, WA (US); Scott Laverne, Everett, WA (US); Michael J Zizzo, Mill Creek, WA (US); Gregory W Nelson, Everett, WA (US); Gennady V Shankov, Moscow (RU); James G Trimble, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 1345 days.

(21) Appl. No.: 11/509,126

(22) Filed: Aug. 24, 2006

(65) Prior Publication Data

US 2008/0078877 A1 Apr. 3, 2008

(51) Int. Cl.
*B64C 1/14* (2006.01)
(52) U.S. Cl. .................................................... 244/129.3
(58) Field of Classification Search .................. 244/119, 244/129.1, 129.3; 49/501–505
See application file for complete search history.

(56) References Cited

U.S. PATENT DOCUMENTS

| 3,691,686 | A | * | 9/1972 | Donegan | 49/56 |
| 4,364,533 | A | * | 12/1982 | Pompei et al. | 244/129.3 |
| 4,541,595 | A | * | 9/1985 | Fiala et al. | 244/129.3 |
| 5,467,943 | A | * | 11/1995 | Umeda | 244/129.3 |
| 6,082,674 | A | * | 7/2000 | White et al. | 244/129.3 |
| 6,227,491 | B1 | * | 5/2001 | Stephan et al. | 244/129.3 |
| 6,786,453 | B2 | * | 9/2004 | Jones | 244/129.3 |
| 6,889,938 | B1 | | 5/2005 | Nordman | |
| 7,028,950 | B2 | | 4/2006 | Salmon et al. | |
| 7,118,069 | B2 | * | 10/2006 | Novak et al. | 244/119 |
| 2006/0118676 | A1 | | 6/2006 | Novak et al. | |

FOREIGN PATENT DOCUMENTS

EP 0 893 341 A2 1/1999

\* cited by examiner

*Primary Examiner* — Tien Dinh

(74) *Attorney, Agent, or Firm* — Harness, Dickey & Pierce, P.L.C.

(57) ABSTRACT

A window assembly for a mobile platform, for example, a commercial aircraft. The window assembly includes a reveal member that is retained within an opening in an interior panel of the mobile platform without the use of independent retaining clips or adhesives. In one embodiment the reveal member is generally rectangular in shape and includes a flange adjacent to each of the four corners thereof. The flanges engage the opening in the structural panel so that the reveal member can be held in a precise position within the opening in the interior structural panel without external fastening clips or adhesives. The window assembly is lighter in weight than existing window assemblies, and can also be easily removed without special tools or disassembly procedures, and also is retrofittable to existing mobile platforms.

18 Claims, 17 Drawing Sheets

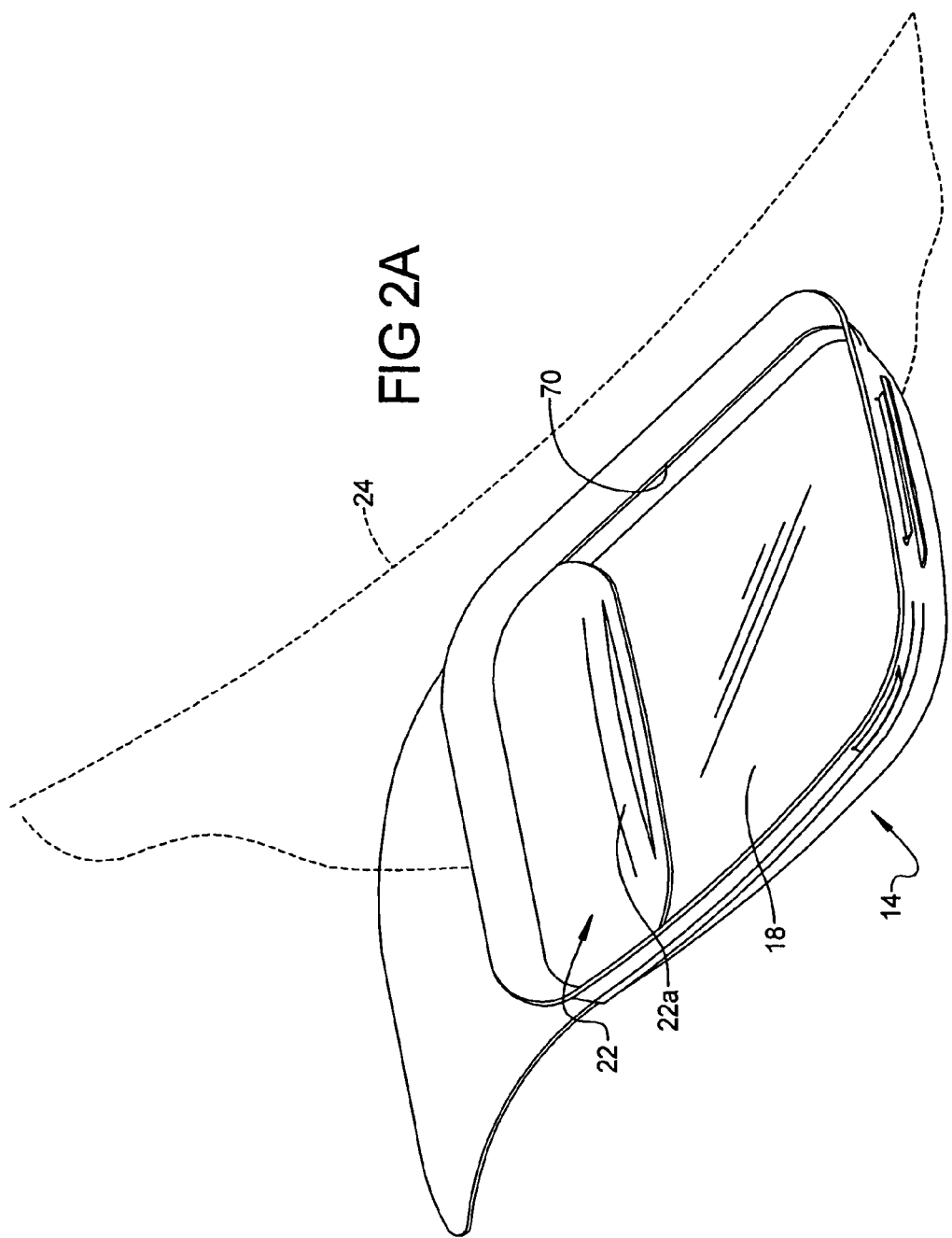

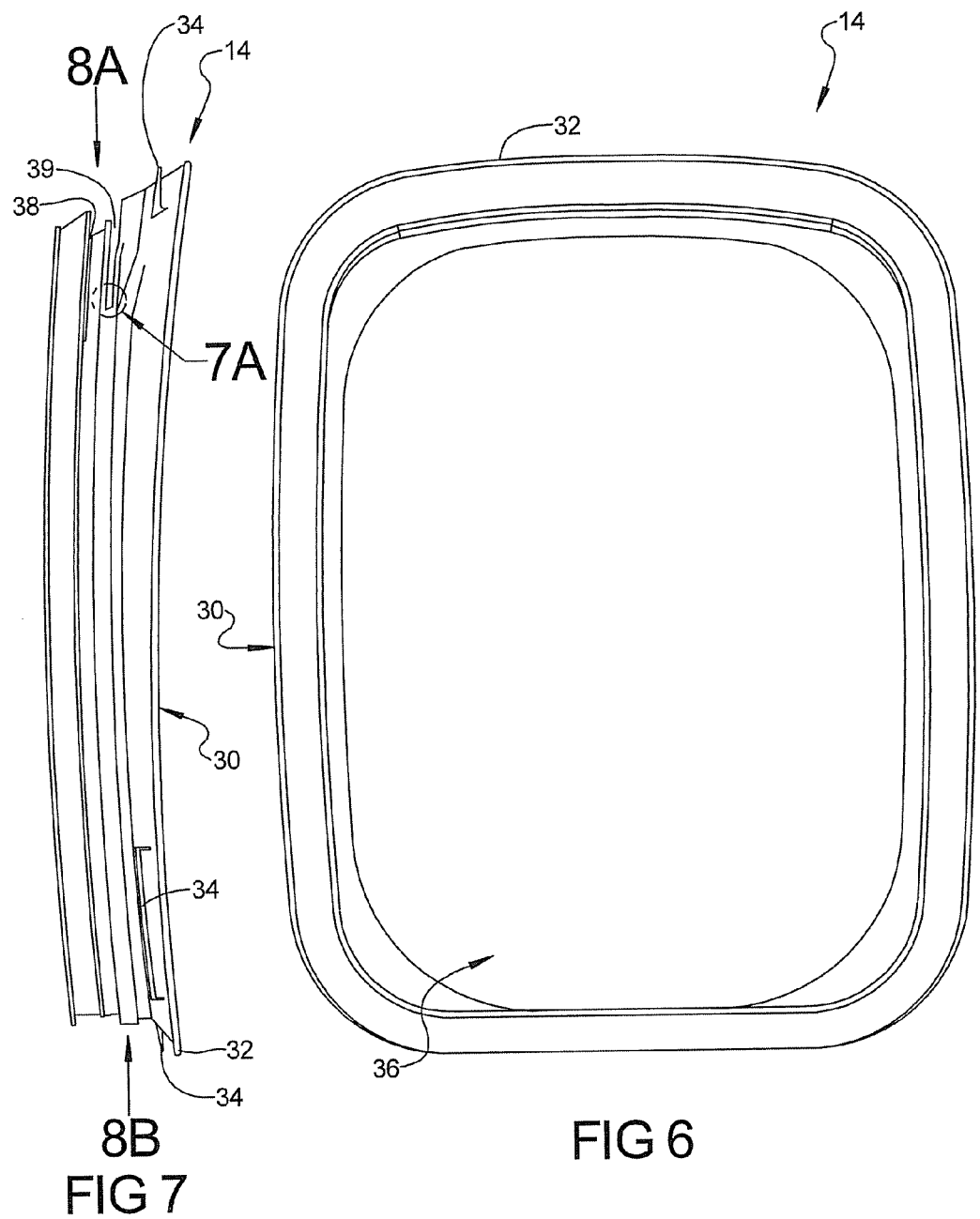

WINDOW ASSEMBLY AND METHOD FOR A MOBILE PLATFORM

FIELD

The present disclosure relates to window assemblies, and more particularly to a lightweight window assembly especially well adapted for use in a mobile platform, such as a commercial aircraft, that can be more quickly and easily installed, with fewer component parts, than typical window assemblies used in mobile platforms.

BACKGROUND

The statements in this section merely provide background information related to the present disclosure and may not constitute prior art.

Various forms of mobile platforms, for example commercial aircraft, include a plurality of windows formed in a wall portion of the mobile platform. Such windows are often made up of several component parts, one or more of which are typically held to an interior wall panel of the mobile platform via a plurality of spring clips or other independent fastening implements. The need to use such implements to hold various components of the window assembly in place in an opening in a wall panel portion of the mobile platform adds to the time and expense associated with construction of the mobile platform. Such construction often makes the window assembly difficult and/or complex to remove in the event that the window assembly needs to be replaced.

Alternative methods of securing a window assembly within a wall panel of the mobile platform have involved the use of adhesives. As can be appreciated, the use of adhesives to secure one or more portions of a window assembly further adds to the complexity and time that is needed to install the window assembly. The use of adhesives also adds to the time needed for disassembly when the window assembly needs to be removed for service or replacement.

Present day window assemblies that require the use of numerous fastening clips and/or adhesives for securement within an opening in a wall panel often also form relatively heavy assemblies. This is particularly so when a number of window assemblies need to be included on a mobile platform, such as a commercial aircraft, which may have 40, 60 or more such window assemblies located on the port and starboard sides of the fuselage. Thus, a window assembly that eliminates one or more retaining components can represent a significant overall weight savings on a mobile platform for those applications where a large number of windows are used.

It would therefore be desirable to provide a window assembly that requires even fewer component parts than present day window assemblies, and which can be installed quickly and easily in a wall panel of the mobile platform without special tools, adhesives, or complex assembly procedures. It would further be highly desirable if such a window assembly could be removed without time consuming and complex removal/disassembly procedures, in the event replacement or repair of the window assembly is needed.

SUMMARY

The present disclosure relates to a window assembly apparatus and method that is especially well adapted for use on mobile platforms, and particularly on commercial aircraft. The window assembly and method, however, is readily adaptable for use in fixed (i.e., non-movable) structures as well.

In one embodiment the window assembly apparatus includes a reveal member having a perimeter portion that defines a window opening. The perimeter portion includes at least one flange, and more preferably a plurality of flanges spaced about the perimeter portion. In one embodiment the reveal member is generally rectangularly shaped, and the flanges are located at the four corners of the reveal member.

The flanges facilitate the snapping engagement of the reveal member within an opening in a panel of the mobile platform, to thus hold the reveal member securely within the opening. In one implementation the flanges cooperate with the perimeter portion to define a plurality of channel sections about the perimeter portion, such that the opening in the panel is engaged at a plurality of spaced apart edge locations when the reveal member is installed in the opening.

In one embodiment a foam panel is placed around the perimeter portion of the reveal member to act as a sealing component. A shade and a shade sheath are secured adjacent to the opening in the panel. The shade is slidably movable by a user between open and closed positions to cover the opening in the reveal member.

The window assembly and method does not require the use of adhesives or numerous independent spring clips to hold the reveal member within the opening in the panel. This contributes to a significantly lighter, more easily installed, as well as more easily replaced, window assembly. The window assembly is also retrofittable into existing mobile platforms, particularly existing commercial passenger aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2A is a perspective view of the reveal member assembled on to a portion of the interior panel, with the shade sheath partially covering the transparent window portion of the window assembly

FIG. 6 is a front plan view of the reveal member;

FIG. 7 is a side view of the reveal member;

DETAILED DESCRIPTION

The following description is merely exemplary in nature and is not intended to limit the present disclosure, application, or uses.

Figure 1:
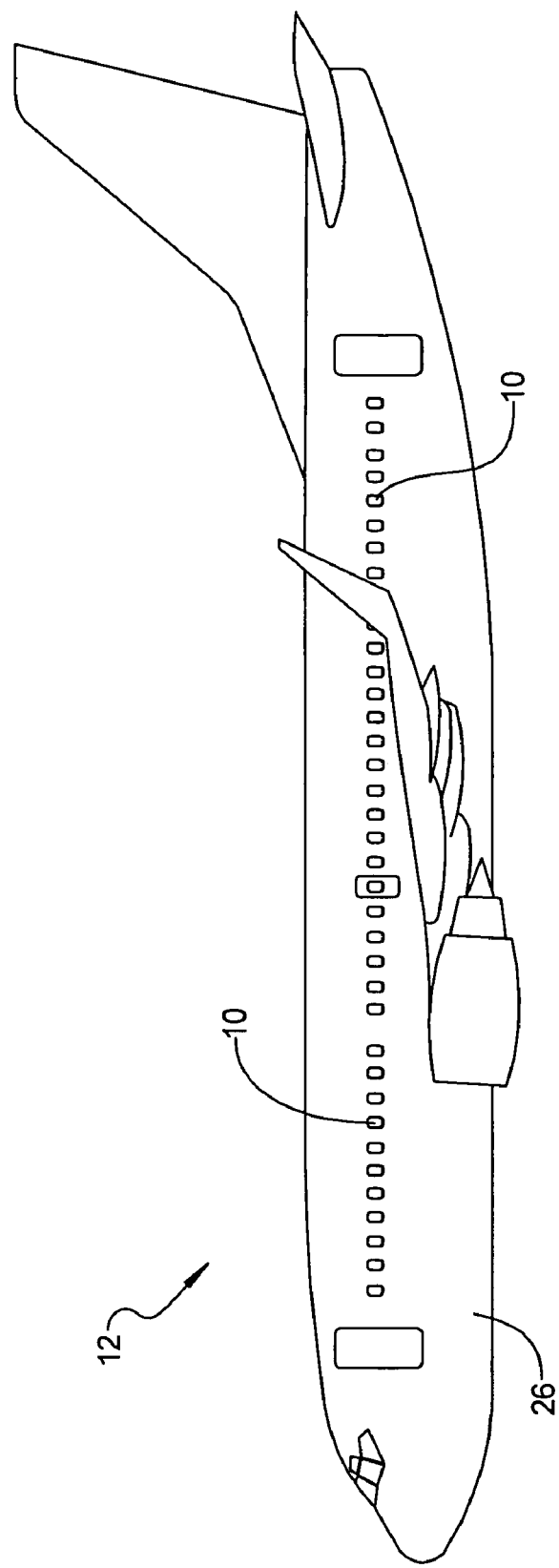
FIG. 1 is a side view of a mobile platform, in this example a commercial aircraft, in which an embodiment of the window assembly of the present disclosure is implemented.

Referring to FIG. 1, there is shown a mobile platform, in this example a commercial aircraft 12, that incorporates a plurality of window assemblies 10. The window assemblies 10 are each constructed in accordance with various embodiments of the present disclosure, as will be described in the following paragraphs. It will be appreciated immediately, however, that the window assembly 10 of the present disclosure could just as readily be included on other types of mobile platforms, for example on rotor craft, maritime vessels such as cruise ships, or on land vehicles such as trains, busses, vans, or on virtually any other form of mobile platform requiring the use of a lightweight, easily installed and removable window. The window 10 could also be used on fixed structures.

Figure 2:
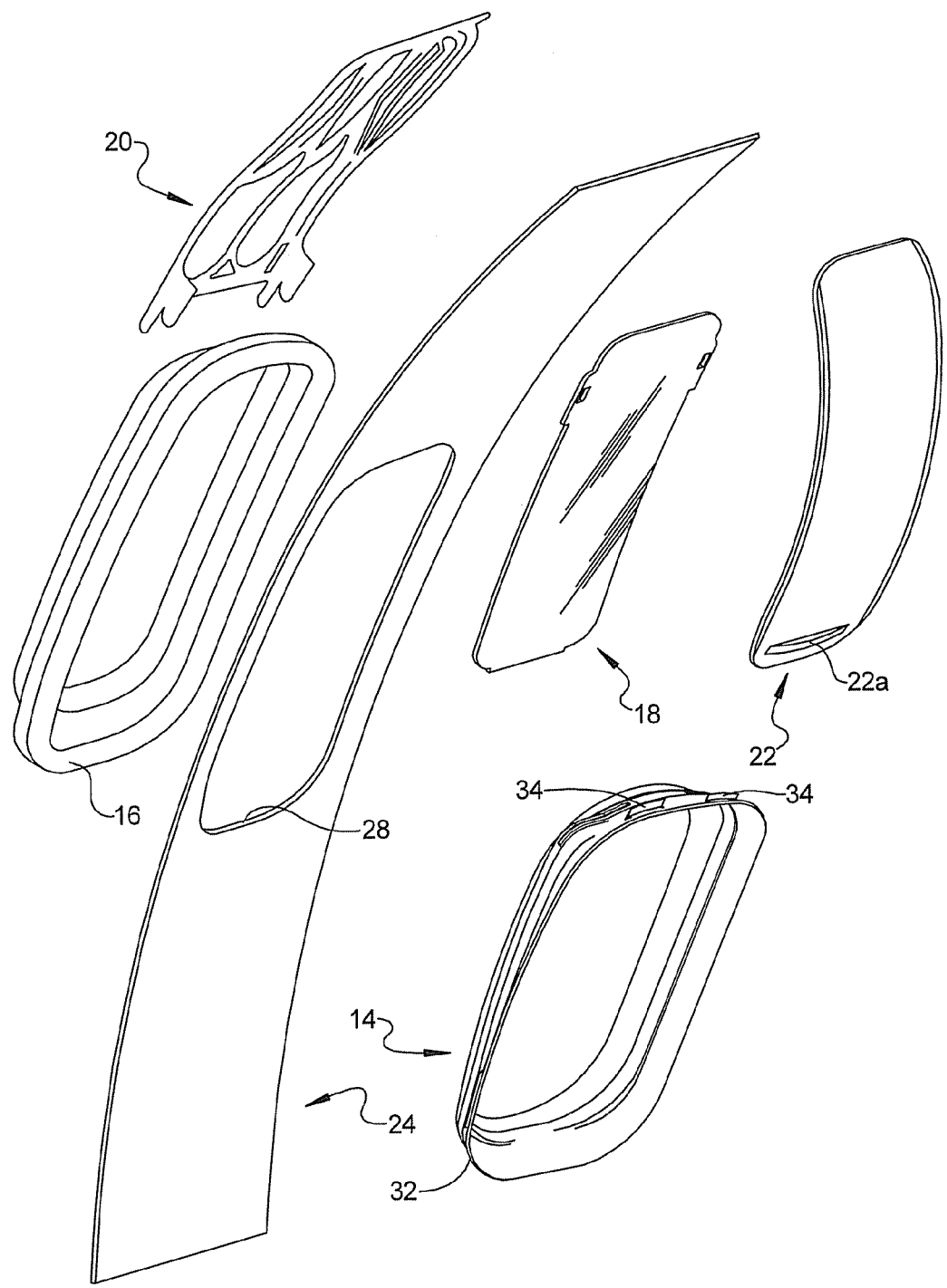
FIG. 2 is an exploded perspective view of the components making up one embodiment of the window assembly shown in FIG. 1, together with a portion of an interior decorative panel used on the inside of the fuselage of the aircraft shown in FIG. 1.

Referring to FIG. 2, an exploded perspective drawing of one embodiment of the window assembly 10 of FIG. 1 is shown. In this embodiment, the window assembly 10 includes a snap-in reveal member 14, a seal 16, a transparent dust cover 18, a shade sheath 20, and a shade panel 22. A portion of a wall panel 24 is also illustrated, which represents a decorative interior panel used in the cabin area within a fuselage 26 (FIG. 1) of the aircraft 12. The panel 24 includes an opening 28 into which the reveal member 14 is installed.

The reveal member 14 is shown in greater detail in FIGS. 3-8B. It will be appreciated that the shape of the reveal member 14 will preferably correspond to the shape of the opening 28 in the panel 24. Although, the reveal member 14 is illustrated as being generally rectangular in shape, the reveal member could be formed in other shapes, such as oval, circular, square, etc., and therefore is not limited to only one particular shape.

Figure 3:
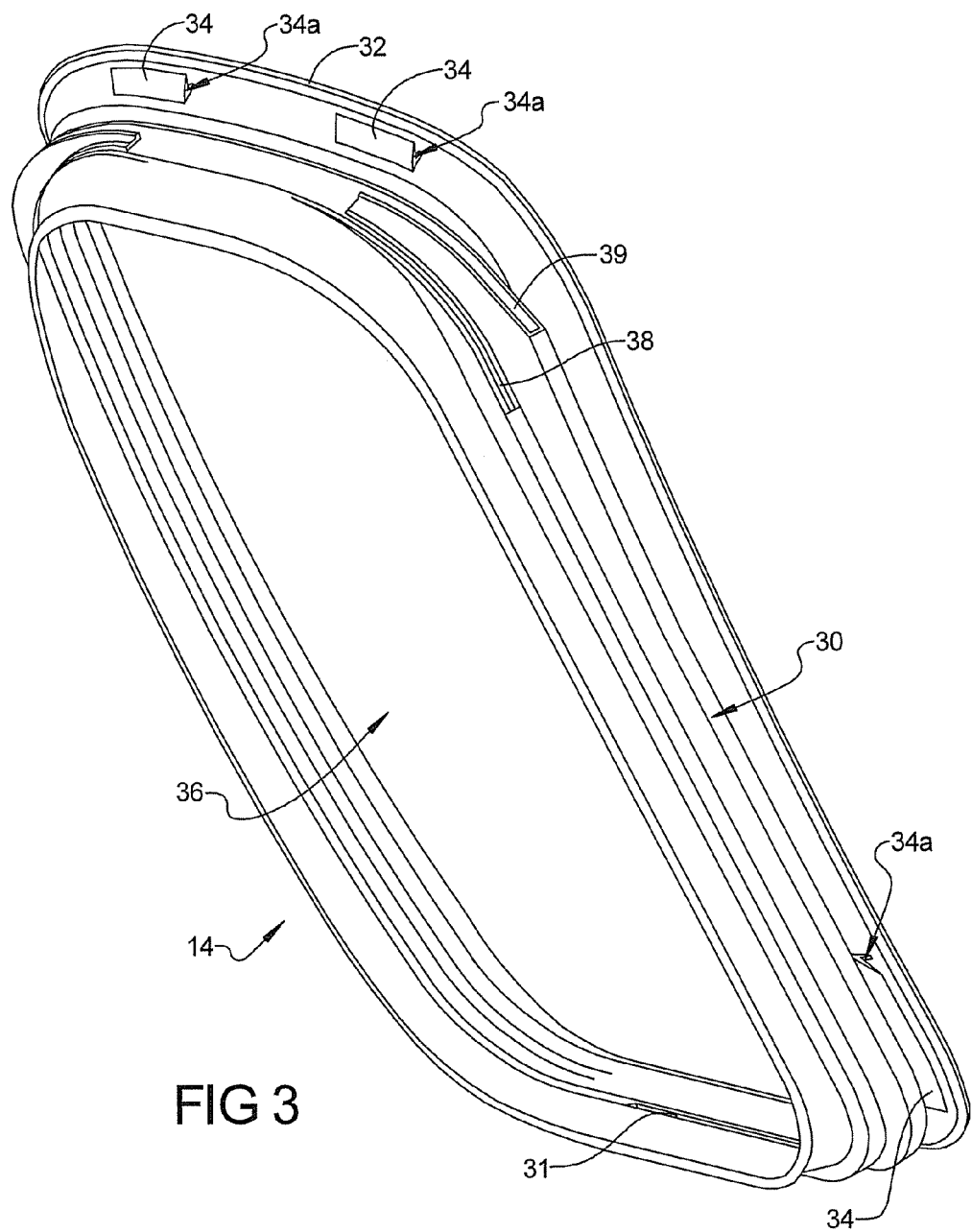
FIG. 3 is a rear enlarged perspective (out-board side) view of the reveal member of the window assembly.
Figure 4:
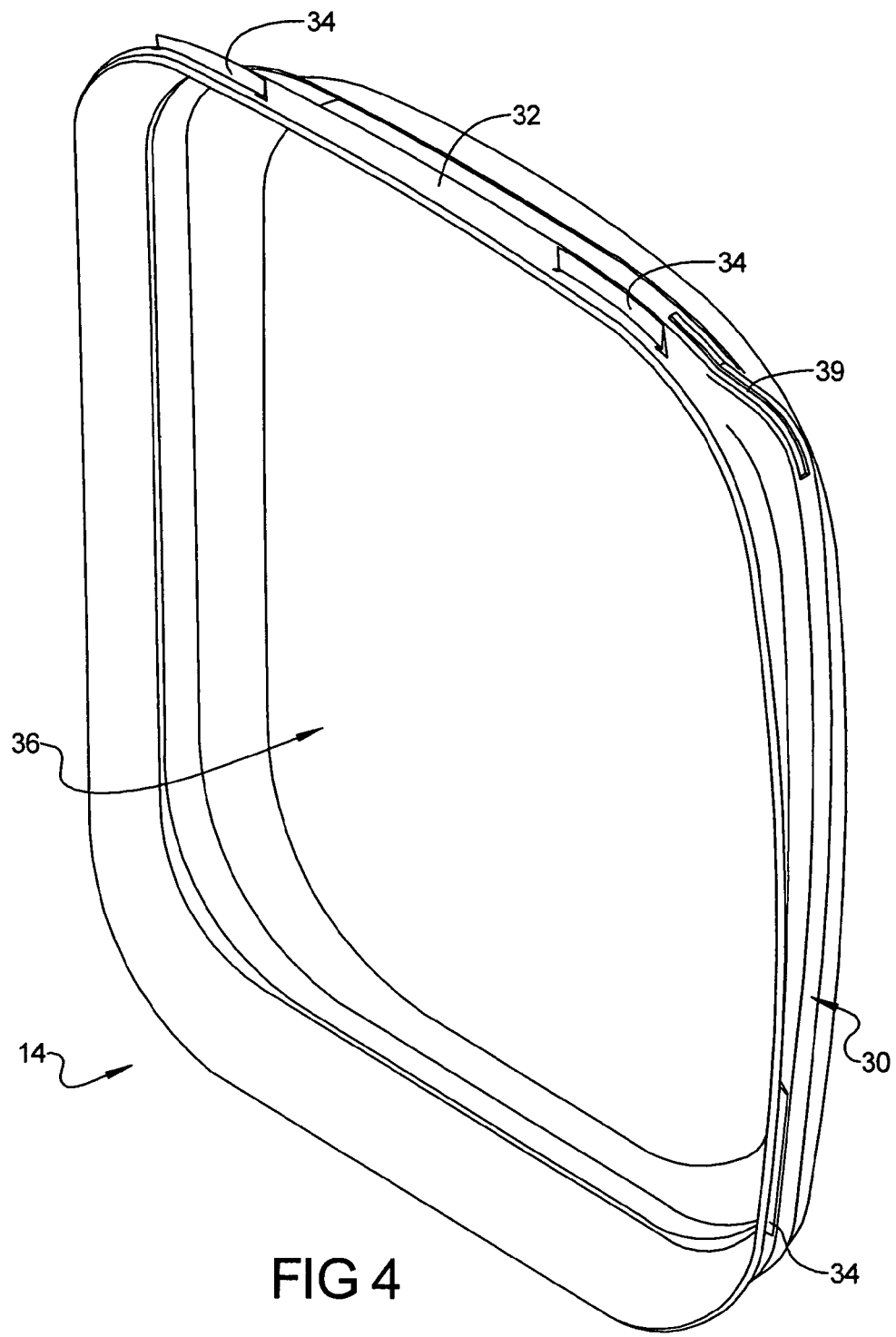
FIG. 4 is a front perspective (in-board side) view of the reveal member.
Figure 5:
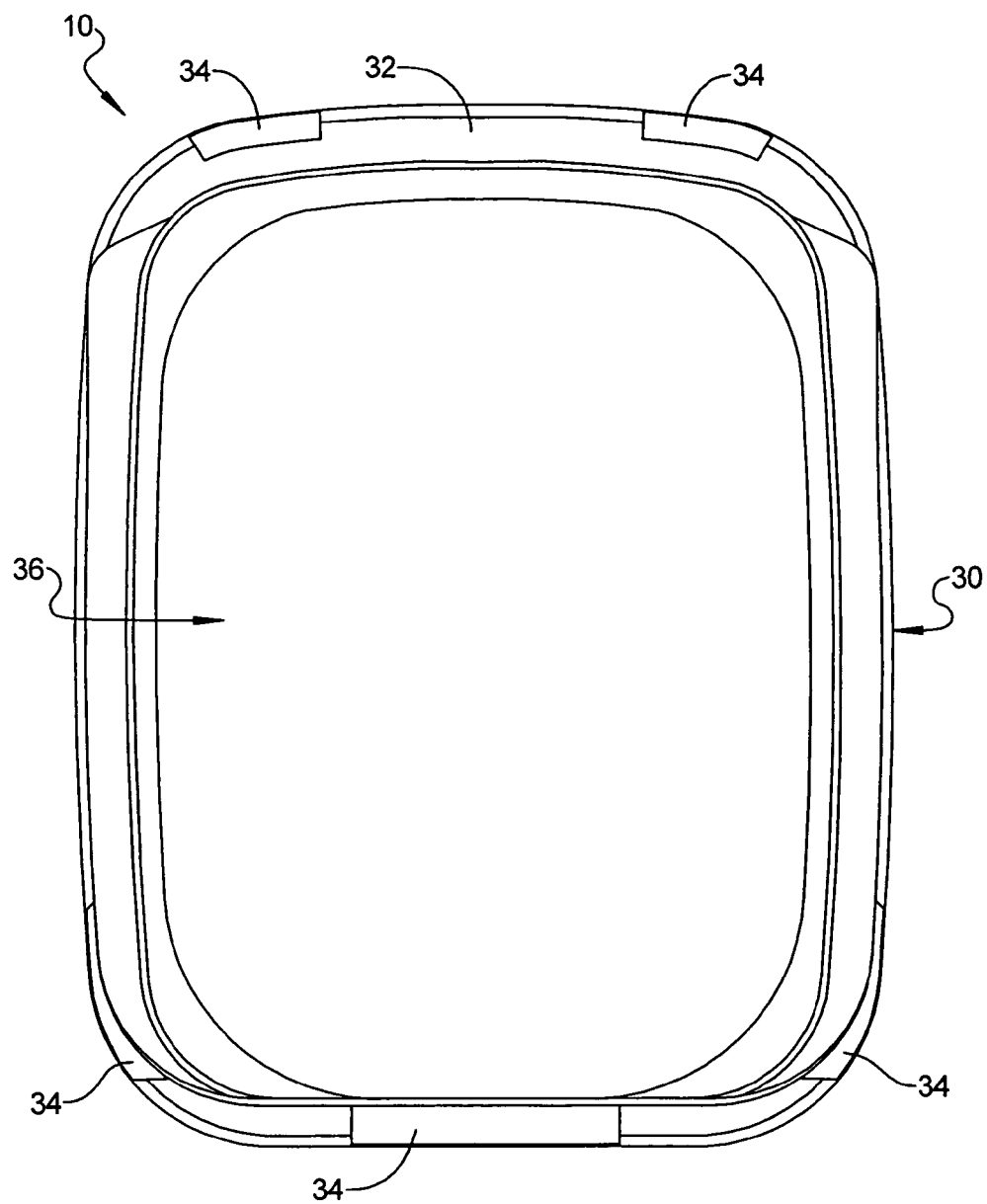
FIG. 5 is a rear plan view of the reveal member of FIG. 3.

As shown in FIGS. 3-5, the reveal member 14 includes a perimeter portion 30 having an integrally formed, enlarged lip portion 32 and a slot 31 (visible in FIG. 3). Perimeter portion 30 includes a slightly flexible or deformable flange 34 fixedly secured at each of the four corners thereof, and also along a bottom edge of thereof. Each flange 34 forms a generally hook shaped portion, and cooperates with the lip portion 32 to form five channel sections 34a. The flanges 34 and the entire reveal member 14 may be integrally formed as a single piece component, such as through an injection molding process using a suitably high strength plastic. One suitable plastic is polycarbonate. This enables a rigid, lightweight and structurally strong component to be formed which is easily handled and manipulated by an individual during installation of the window assembly 10. Alternatively, the reveal member 14 could be formed in two pieces that are secured together prior to being installed in the panel 24. However, it is anticipated that the single piece construction will be highly preferred as a more simple, and more cost effectively manufacturable component part.

Figure 7A:
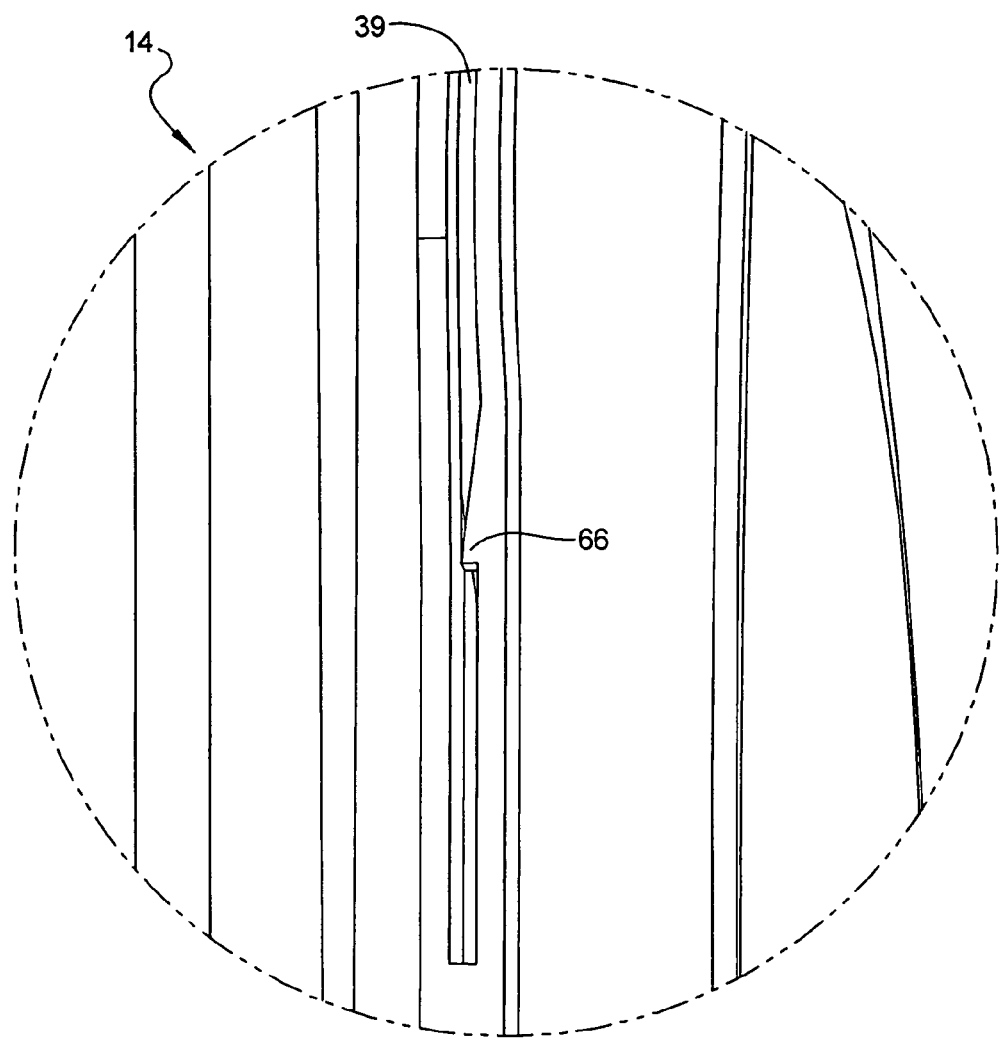
FIG. 7A is an enlarged view of the circled portion in FIG. 7.
Figure 8A:
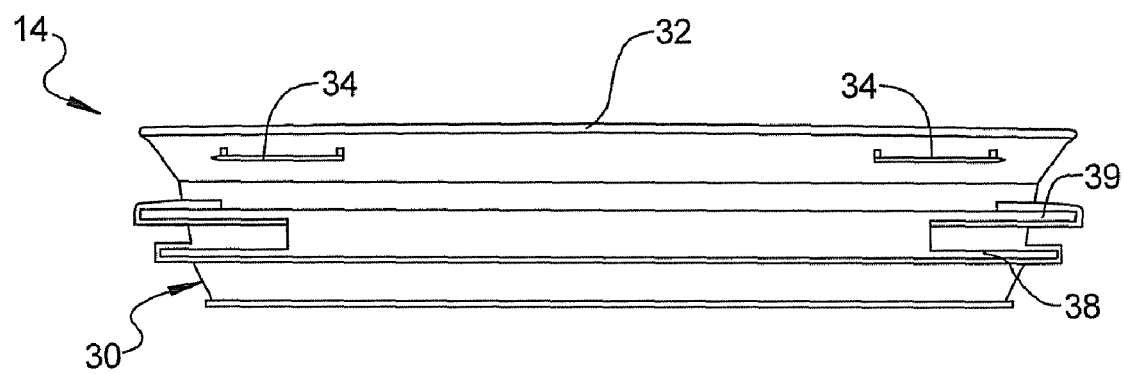
FIG. 8A is a top end view taken in accordance with directional line 8A in FIG. 7, of the reveal member.
Figure 8B:
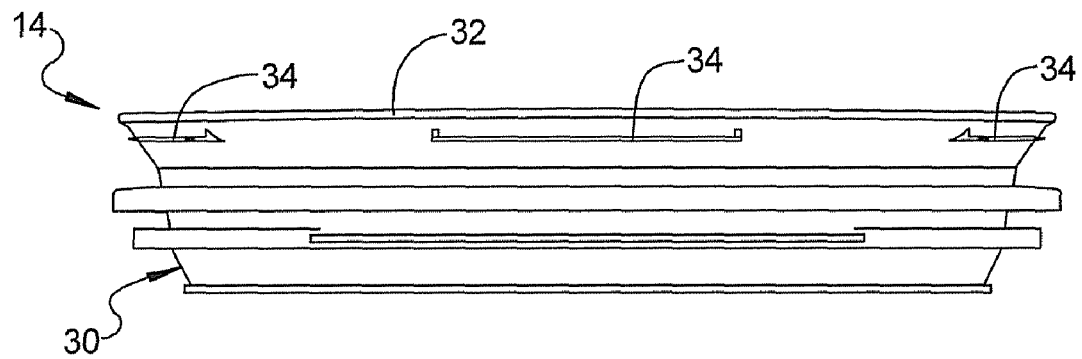
FIG. 8B is a bottom end view of the reveal member taken in accordance with directional line 8B in FIG. 7.

In FIGS. 3, 7 and 8A, the top perimeter portion 30 defines a window opening 36. A top end of the perimeter portion 30 includes a first elongated slot 39 through which the shade panel 22 may be inserted to permit opening and closing of the shade panel 22. A second slot 38 permits the dust cover 18 to be inserted in the reveal member 14. The transparent dust cover 18 is positioned over the window opening 36 during the assembly process, as will be described further in the following paragraphs.

Figure 2B:
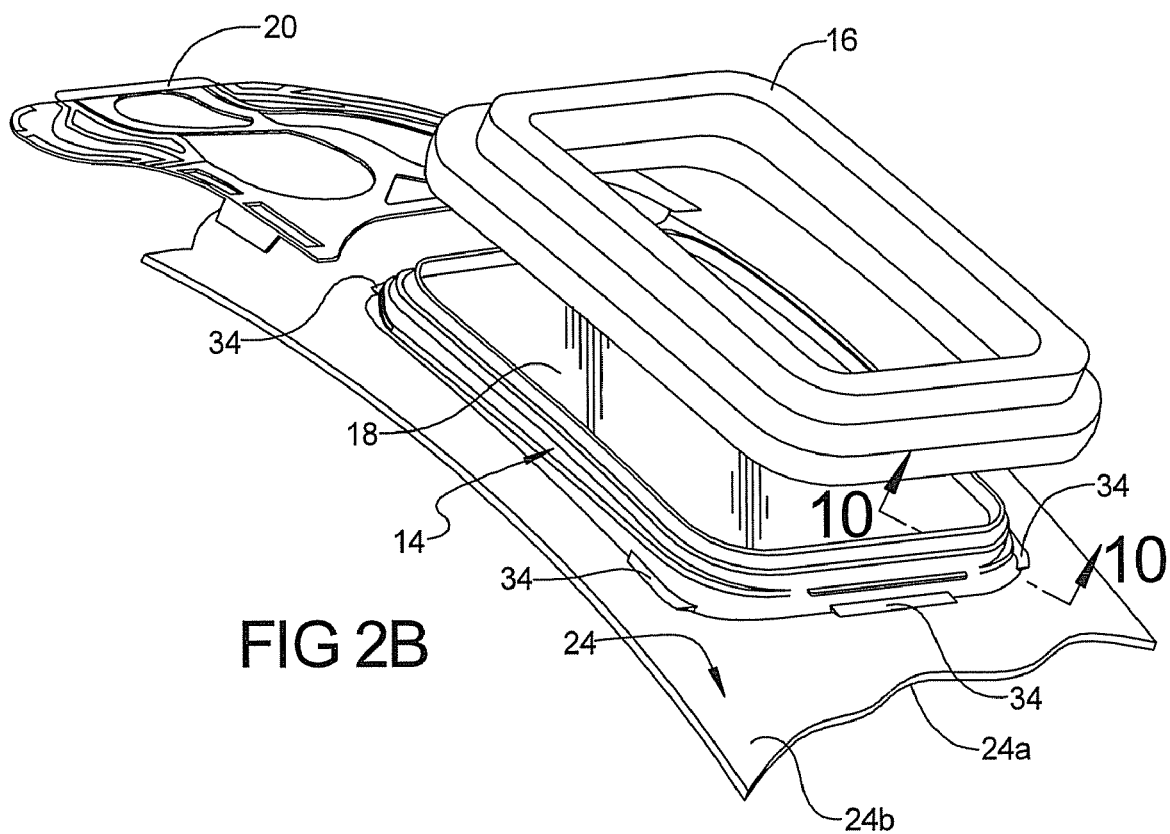
FIG. 2B is a perspective view of the reveal member assembled to the interior panel, but shown looking towards an exterior surface of the interior panel.
Figure 11:
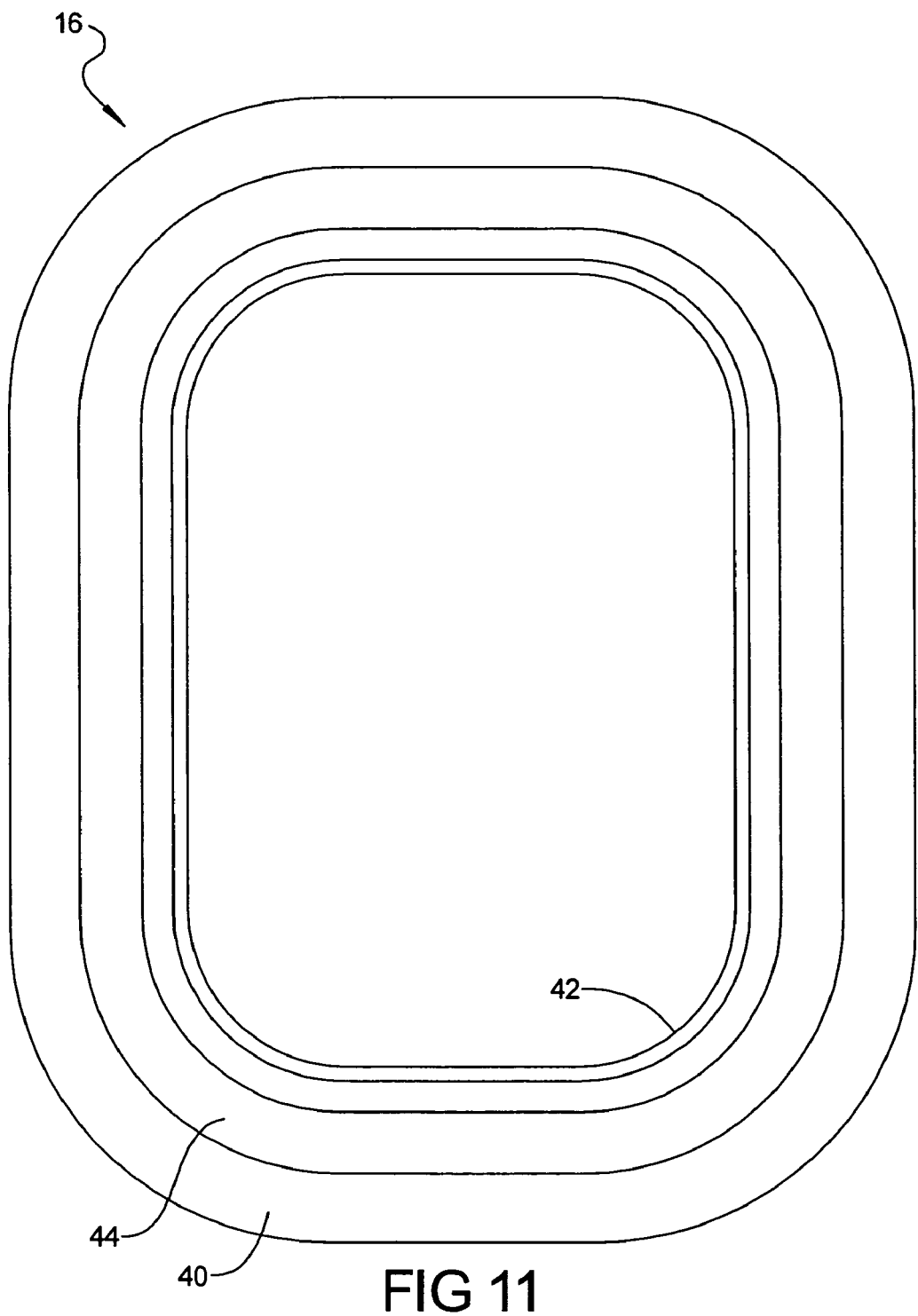
FIG. 11 is a plan view of the seal used in the window assembly.

The seal 16 is shown in FIG. 11. The seal 16 preferably comprises a foam seal. The seal 16 has a perimeter portion 40 defining an opening 42. The perimeter portion 40 includes a circumferential, raised rib portion 44. The seal 16 is preferably molded from BMS 8-371 Zotefoam, which is a closed cell, cross-linked, polyethylene thermoplastic material foam, but could readily be formed from other suitable materials. The opening 42 is sized to generally match the window opening 36 in the reveal member 14. Referring to FIG. 2B, during assembly, the seal 16 is simply laid over the reveal member 14 once the reveal member 14 is secured to the panel 24. The seal 16 is typically positioned adjacent outboard surface 24b of the panel 24, and against an out-board portion of the fuselage of the aircraft 12.

Figure 13:
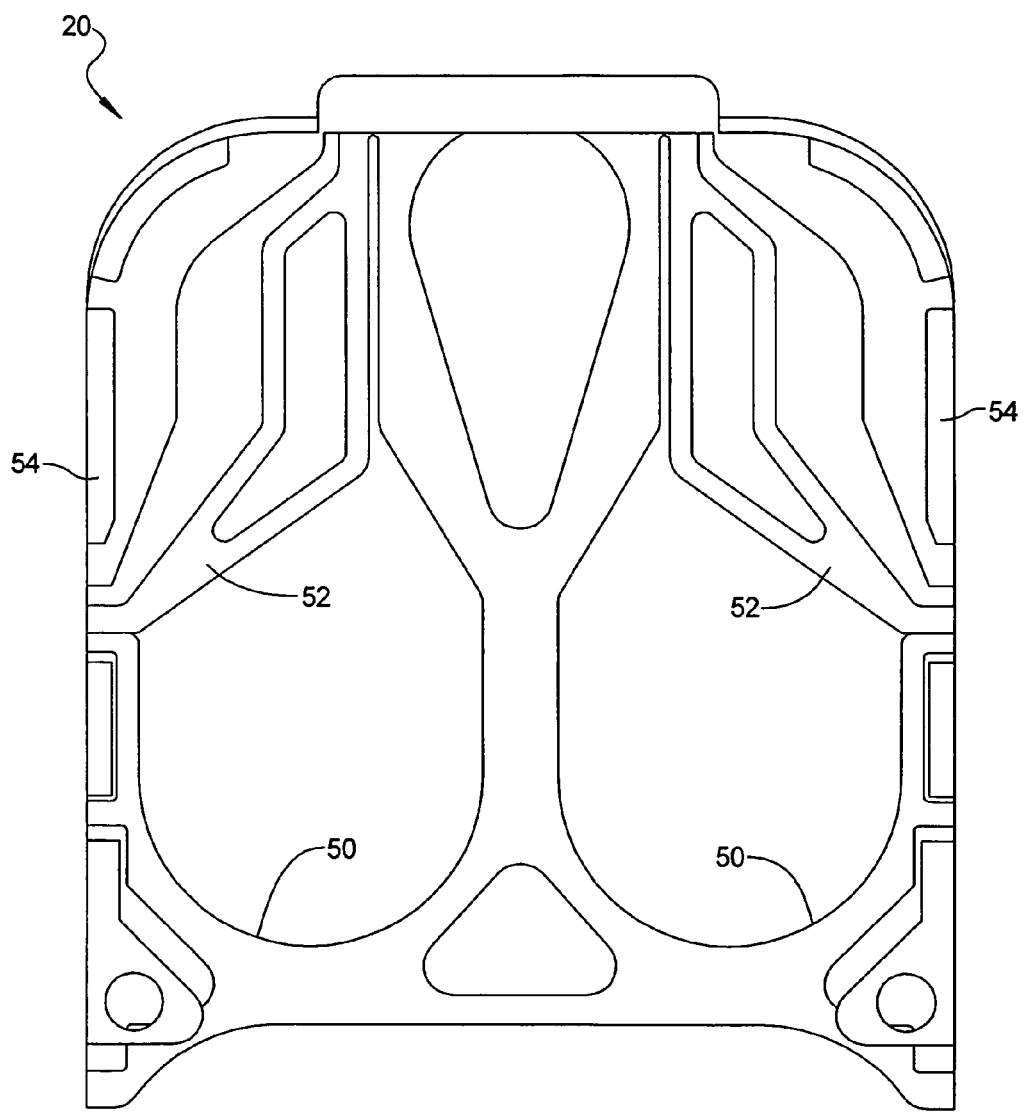
FIG. 13 is a plan view of the shade sheath.

In FIG. 13, the shade sheath 20 is shown in greater detail. The shade sheath 20 is preferably formed as a single piece component, and preferably molded from a suitably high strength plastic, such as polycarbonate plastic. The shade sheath 20 is positioned above the reveal member 14 (note FIG. 2B) on the outside surface 24b of the panel. With specific reference to FIG. 13, the shade sheath 20 includes a pair of enlarged openings 50 having arm portions 52 extending into the enlarged openings 50. Flanges 54 form short channel sections that allow the shade panel 22 to be held by the shade sheath 20. The arm portions 52 and the overall contour of the shade sheath 20, as is visible in FIG. 2A, provide friction against the shade panel 22 to hold it at its raised position once the window assembly 10 is installed in the panel 24. In this regard, it will be appreciated that the shade panel 22 is curved and slightly flexible. Furthermore, its curvature, as visible in FIGS. 2 and 2A, is opposite to the curvature of the panel 24. This helps create friction that helps hold the shade panel 22 at a specific position, relative to the reveal member 14. The shade panel also includes a raised portion 22a that a user can engage with one or more fingers.

Figure 9:
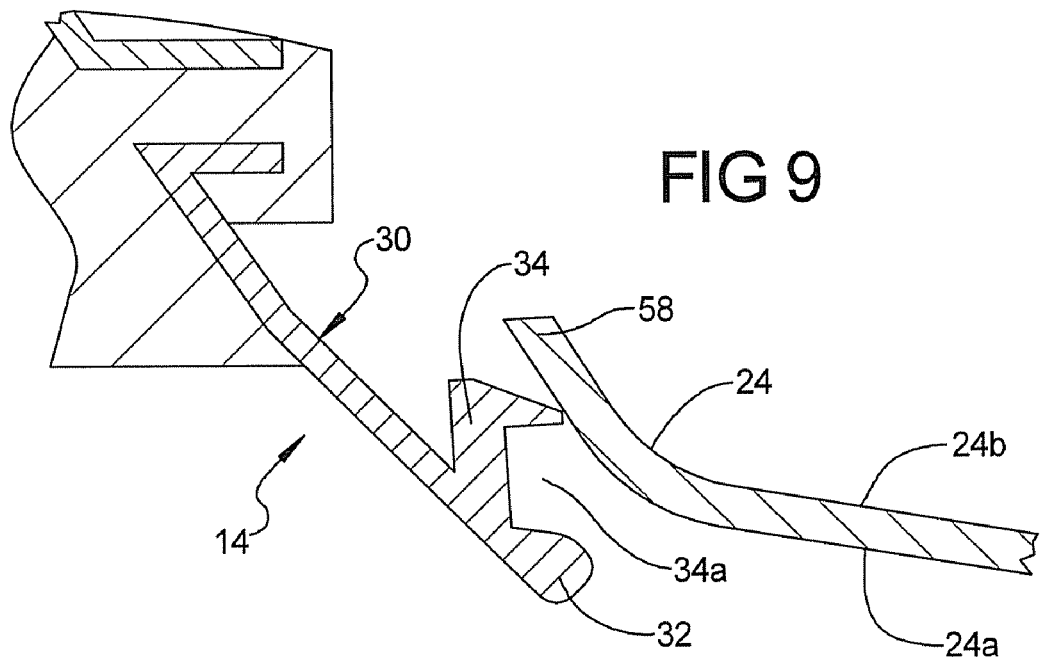
FIG. 9 is a cross sectional view of one corner of the reveal member about to be engaged within the opening in the structural panel, at the area generally denoted by section line 10-10 in FIG. 2B.
Figure 10:
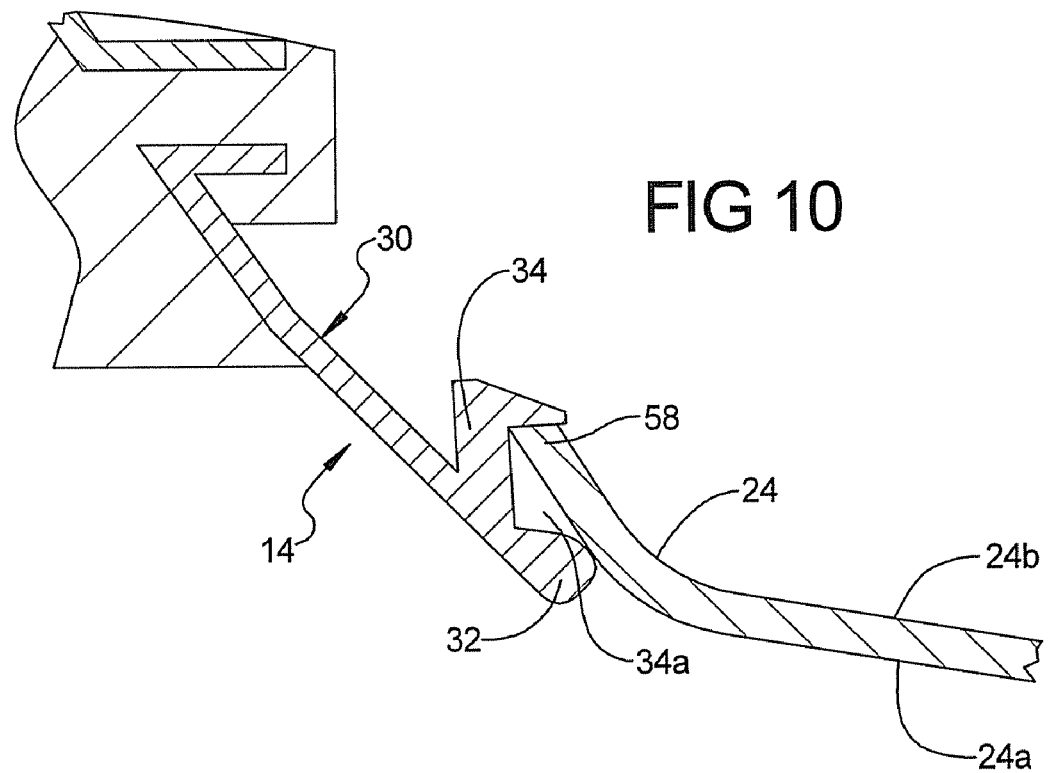
FIG. 10 is a view of the corner of the reveal in FIG. 6 engaged with the edge of the wall portion, in accordance with section lines 10-10 in FIG. 2B.

Referring to FIGS. 9 and 10, the engagement of one corner portion of the reveal member 14 with one corner of the opening 28 in the panel 24 is illustrated. Preferably, the panel 24 includes a slightly outwardly flared lip portion 58, with the flaring projecting away from the interior cabin area of the fuselage 26 of the aircraft 12. The reveal member 14 is installed in the opening 28 in the panel 24 by aligning it over the opening 28 from an inside surface 24a (FIG. 2) of the panel 24. The reveal member 24 is then urged into the opening 28, one corner at a time. The flange 34 in each of the four corners of the reveal member 14 (as well as the flange 34 at the center of the bottom end) snappingly engages with a portion of the lip portion 58, as shown in FIG. 10. By placing the flanges 34 at the four corners of the lip portion 32, a wedging action occurs as the flanges 34 snappingly engage with the lip portion 58 of the panel 24. More particularly, the flanges 34 diagonally opposite to one another effectively work against one another to wedge the reveal member 14 securely into the opening 28. Once in the fully inserted position shown in FIG. 10, a section of the lip portion 58 of the panel 24 is captured within each channel 34a, and the flanges 34 prevent the reveal member 14 from moving back inwardly through the panel 24 towards the interior surface 24a.

Figure 12:
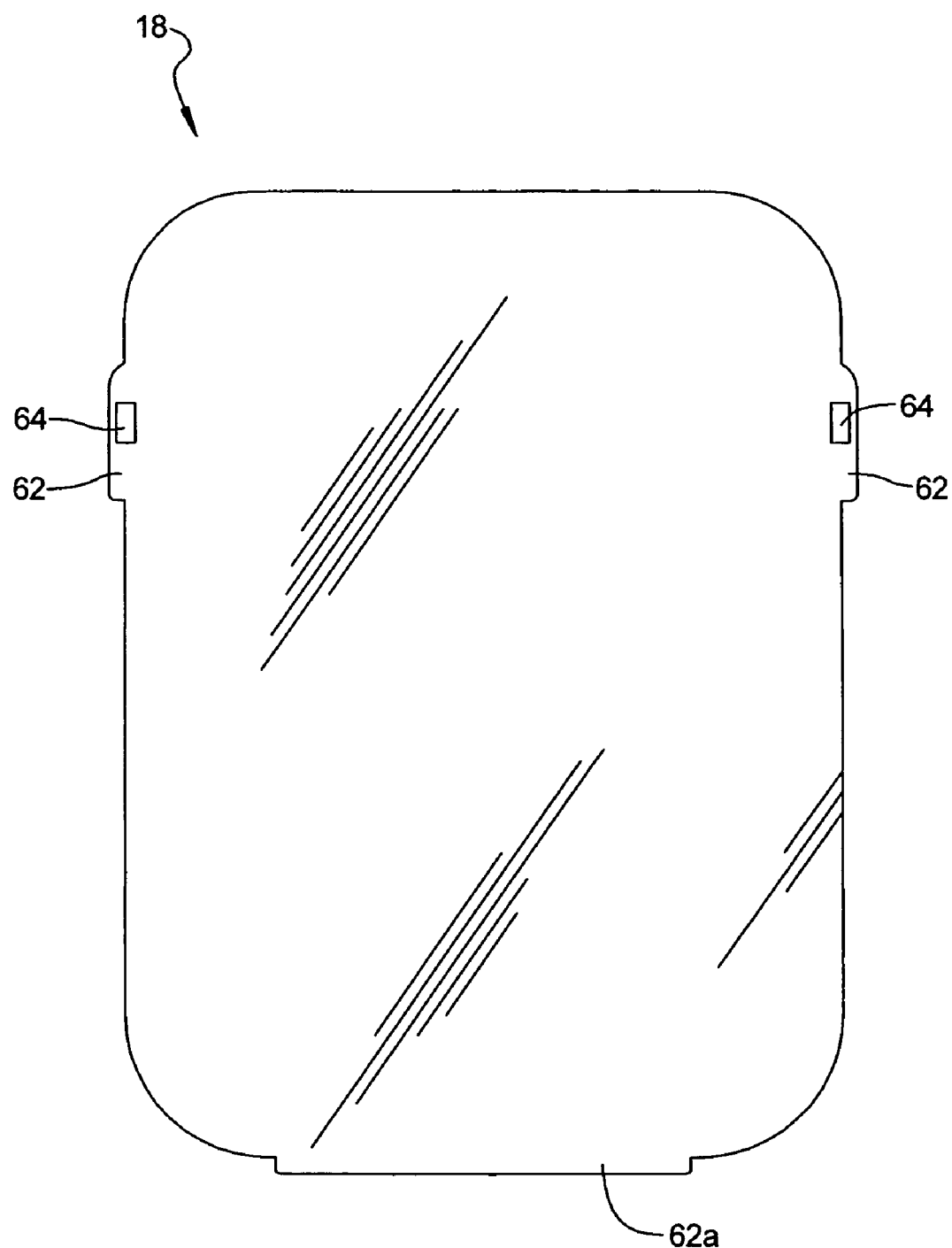
FIG. 12 is a plan view of the dust cover.

With brief reference to FIG. 12, the transparent dust cover 18 is illustrated in greater detail. The dust cover includes a pair of ears 62 each having an opening 64, and a lip 62a. The dust cover 18 has dimensions enabling it to be inserted into the slot 38 in the reveal member 14, and a longitudinal length that preferably allows a portion thereof to protrude outwardly from the reveal member 14 when it is fully inserted into the reveal member. Once fully inserted, the lip 62a engages the slot 31 (FIG. 3) in the reveal member 14. The dust cover 18 is preferably molded from a translucent plastic. One suitable material is BMS 8-251 polycarbonate plastic.

Figure 14:
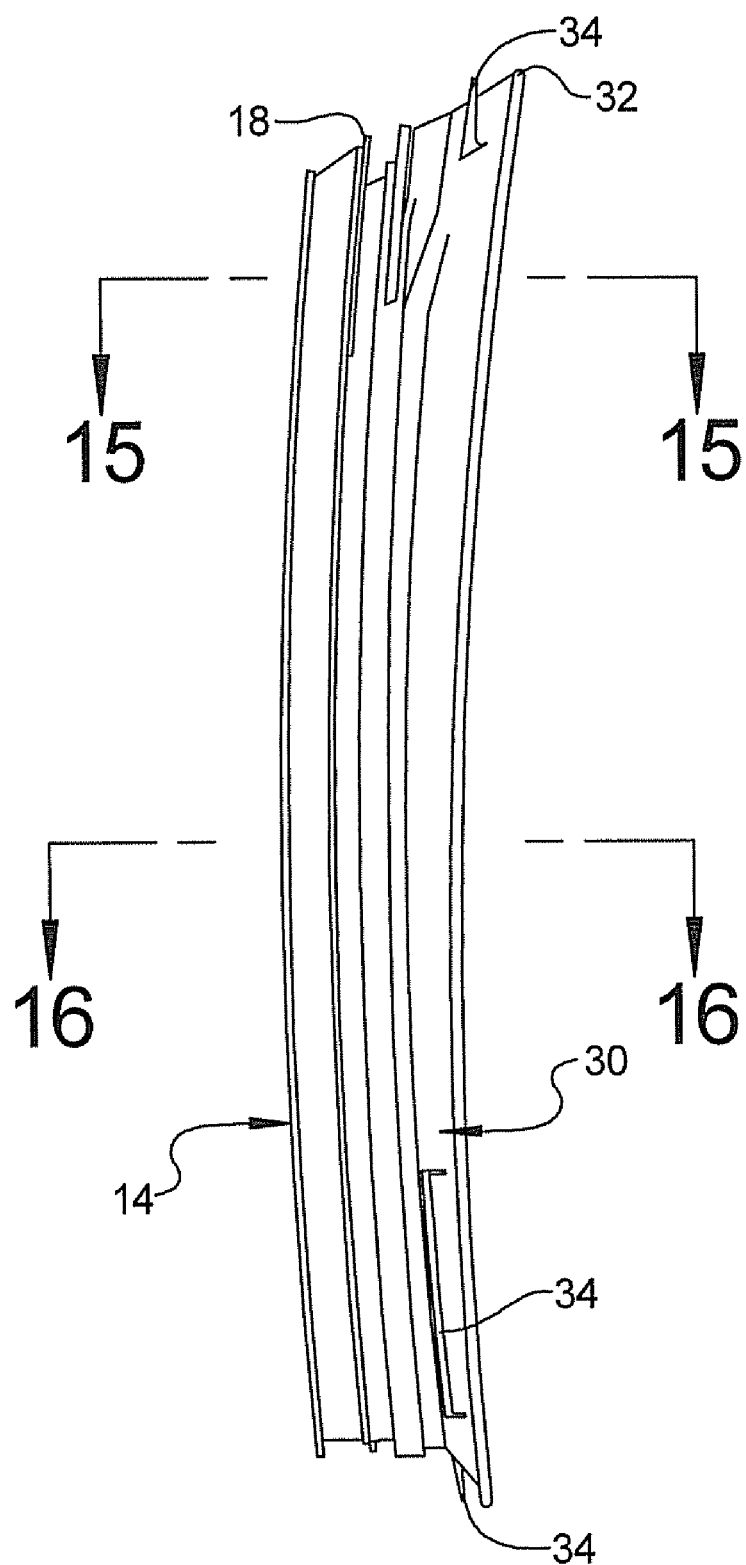
FIG. 14 is a side view of the reveal member with the dust cover and the shade sheath inserted into the reveal member.
Figure 15:
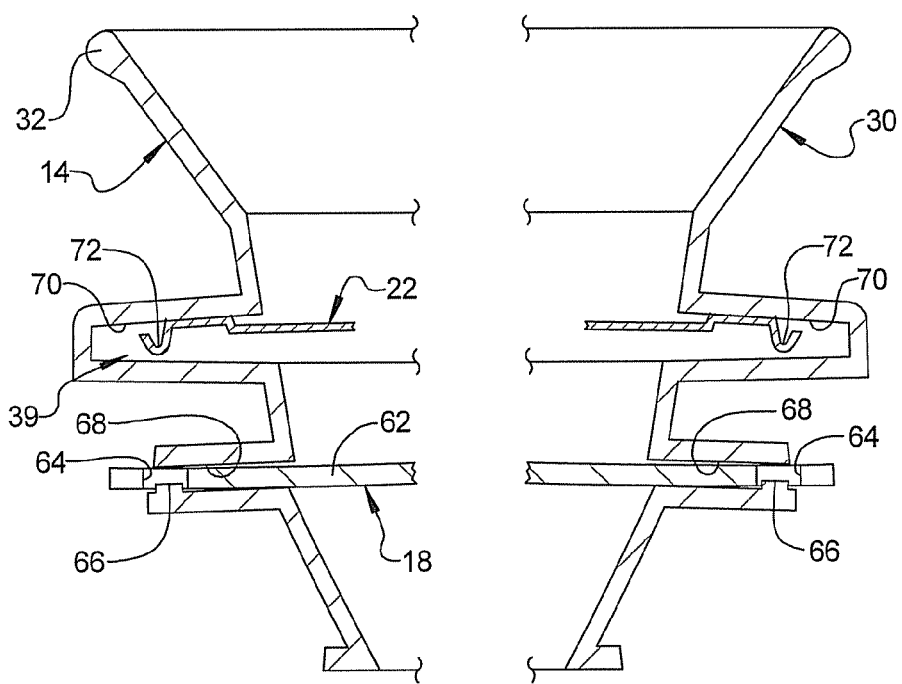
FIG. 15 is an end cross-sectional view illustrating the dust cover and the shade sheath each being supported in their corresponding channels in the reveal member, in accordance with section line 15-15 in FIG. 14.
Figure 16:
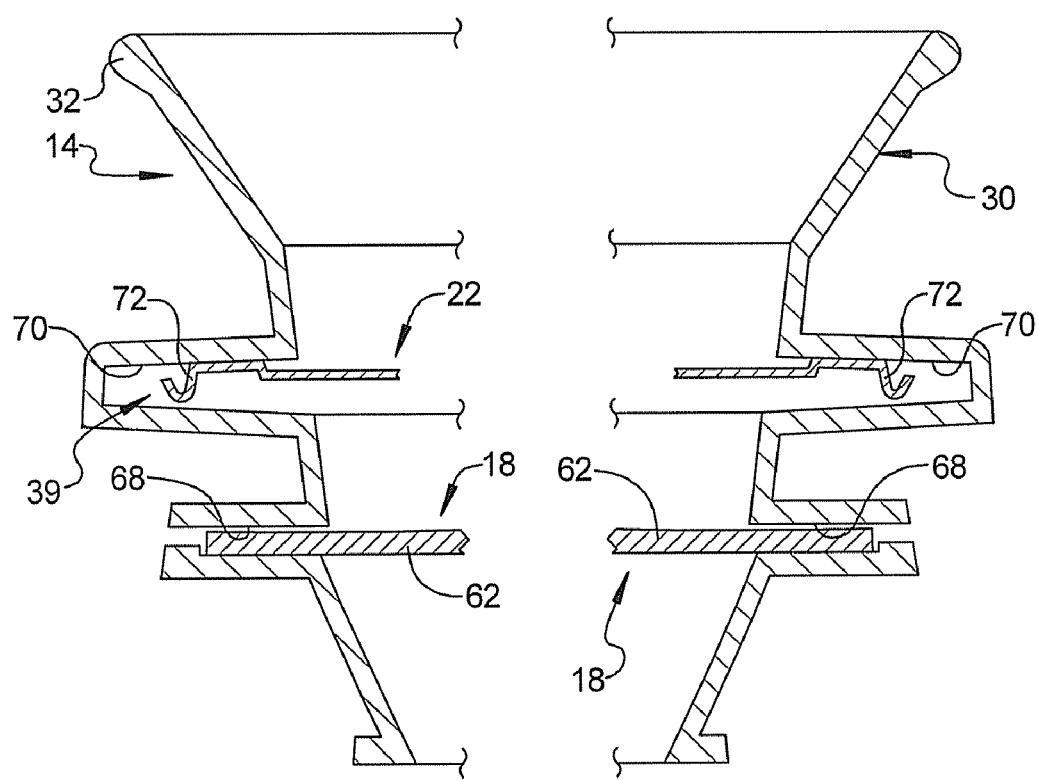
FIG. 16 is a cross-sectional end view illustrating the engagement of the dust cover and the locking shoulders of the reveal member.

With brief reference to FIGS. 7A and 15, the reveal member 14 can also be seen to include a pair of locking shoulder portions 66 adjacent a top portion of the reveal member. The locking shoulders 66 are formed on each side of the slot 38 (FIGS. 3 and 8) such that two locking shoulders are provided for engaging the opposite longitudinal sides of the dust cover 18, and retaining the dust cover 18 when the dust cover is fully slidably inserted into the slot 39. In this regard, it will also be appreciated that the reveal member 14 preferably includes a pair of integrally formed longitudinal channels 68 along the perimeter portion 30 for engaging with opposing longitudinal edges of the dust cover 18. Channels 68 help to form the slot 38. FIG. 14 illustrates the dust cover 18 fully inserted in the slot 38 of the reveal member 14. FIG. 15 illustrates the openings 64 at an upper end of the dust cover 18 engaged with the locking shoulders 66. FIG. 16 illustrates the dust cover supported by the channels 68.

Referring further to FIGS. 2A, 15 and 16, the reveal member 14 can also be seen to include a pair of opposing channels 70 that slidably receive opposing, J-shaped edges 72 of the shade panel 22 when the shade panel is lowered into its closed position. The channels 70 help to form the slot 39. This enables the shade panel 22 to be guided and maintained in alignment with the reveal member 14 as the shade panel is moved up and down by a user.

It is a significant advantage of the construction of the reveal member 14 that it can be held precisely positioned within the opening 28 in the panel 24 without the use of adhesives or other independent, spring clip-like retaining elements. The installation of the reveal member 14, and thus of the entire window assembly 10, is thus significantly expedited. The elimination of independent retaining clips that are needed with various present day window reveal members further adds to the weight savings associated with the overall window assembly 10. In various applications on mobile platforms, and particularly on commercial aircraft, such a weight savings can be significant, and in some instances on the order of 0.75 pounds (1.65 kg) per window over conventional window assemblies secured by numbers of independent retaining clips or adhesives.

Another significant advantage of the window assembly 10 is that it is removable without the need for complex and/or time consuming disassembly procedures. By using a suitable tool, for example a screwdriver or other like implement, the reveal member 14 can be urged out of the window opening 28, one corner at a time. Since no adhesives are employed in holding the reveal member 14 within the opening 28 in the panel 24, the disassembly process can be completed rapidly and without the use of a heat gun, various toxic solvents or other tools/substances that might otherwise be required to release an adhesively bonded reveal member, and that might require additional, time consuming clean-up procedures.

Still another important advantage of the window assembly 10 is that it is readily retrofittable on existing mobile platforms, for example existing commercial aircraft. Obviously, the shape of the reveal member 14 would preferably generally match the shape of the window opening in the interior panel of the mobile platform into which the window assembly 10 is being retrofitted. The other window assembly 10 components (i.e., seal 16, dust cover 18, shade 22 and shade sheath 20) would also preferably be constructed in accordance with the dimensions of the pre-existing window opening as well. The ability to retrofit the window assembly 10 into existing commercial aircraft may also provide a significant weight savings for existing aircraft, which in turn may enhance fuel economy, and thus reduce operating costs for the aircraft.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A snap-in window apparatus for a mobile platform, wherein the mobile platform has a panel having a panel opening for receiving the window apparatus, the snap-in window apparatus comprising:
   a single piece reveal member having a perimeter portion that defines a window opening, the perimeter portion including an integrally formed, enlarged lip portion; and
   a plurality of at least three resilient flanges non-removably secured to said perimeter portion adjacent said enlarged lip portion and spaced apart about said perimeter portion, each of said at least three resilient flanges and said enlarged lip portion cooperating to form a channel to receive an outwardly angled edge portion of said panel, and operable to engage with the edge portion of said panel adjacent said panel opening when said reveal member is inserted into said panel opening, to hold said reveal member within said panel opening.

2. The apparatus of claim 1, wherein said reveal member comprises a single piece component.

3. The apparatus of claim 1, wherein each said flange is integrally formed with said perimeter portion.

4. The apparatus of claim 1, wherein each said flange and said enlarged lip portion of said perimeter portion cooperate to define the channels within which said edge portion of said panel engages.

5. The apparatus of claim 1, wherein each said flange comprises a hook shape.

6. The apparatus of claim 1, wherein each said flange is flexible to facilitate snapping engagement with said edge portion of said panel opening.

7. The apparatus of claim 1, wherein said reveal member comprises a generally rectangular shape having four corner portions, with each one of said corner portions including the flange for engaging with a corresponding section of the edge portion of said panel adjacent said panel opening, and an additional flange formed at a midpoint of one side of said reveal member.

8. The apparatus of claim 1, further comprising a foam seal having a perimeter portion forming a central opening, the seal being adapted to be positioned adjacent to said reveal member to lay over said perimeter portion.

9. The apparatus of claim 1, further comprising:
- a user manipulatable shade panel for selectively covering said window opening, and adapted to be positioned adjacent said reveal member;
- a shade sheath adapted to be positioned adjacent said reveal member, for guiding movement of said shade panel between open and closed positions relative to said window opening, and holding said shade panel in a selected position; and
- wherein said reveal member includes an elongated slot formed in said perimeter portion for enabling a major portion of said shade panel to be moved therethrough between said open and closed positions.

10. The apparatus of claim 1, further comprising a transparent dust cover adapted to be positioned within the window opening in the reveal member.

11. The apparatus of claim 1, wherein said reveal member is releasable from said panel.

12. The apparatus of claim 11, further comprising a transparent dust cover adapted to be positioned over the window opening.

13. A snap-in window apparatus for a mobile platform, wherein the mobile platform has a panel having a panel opening for receiving the window apparatus, the snap-in window apparatus comprising:
- a generally rectangular shaped reveal member having a perimeter portion defining four corners, and which also defines a window opening; and
- a plurality of resilient flanges, with said flanges being located at said four corners of the perimeter portion of the reveal member, and each of said flanges being farmed-en non-removably secured to said perimeter portion, each said flange cooperating with said perimeter portion to form an associated channel section, each said flange operating to snappingly engage with a section of an edge portion of said panel so that sections of said edge portion are captured within said channel sections when said reveal member is inserted into said panel opening, to hold said reveal member within said panel opening without the assistance of external fastening elements;
- a user manipulatable shade panel for selectively covering said window opening, and adapted to be positioned adjacent to said reveal member;
- a shade sheath adapted to be positioned adjacent said reveal member, for guiding movement of said shade panel between open and closed positions relative to said window opening, and holding said shade panel in a selected position; and
- wherein said reveal member includes a pair of elongated slots formed in opposing portions of said perimeter portion, for enabling a major portion of said shade panel to be moved slidably therethrough between said open and closed positions.

14. The apparatus of claim 13, wherein said reveal member is releasable from said panel by wedging each of said flanges on said perimeter portion out away from its adjacent said section of said edge portion.

15. The apparatus of claim 13, wherein each of said flanges is flexible to facilitate engagement with said edge portion of said panel.

16. The apparatus of claim 13, wherein:
said reveal member includes a fifth flange disposed adjacent a longitudinal portion of said reveal member.

17. The apparatus of claim 13, further comprising a foam seal having a perimeter portion forming a central opening, the seal adapted to be positioned adjacent to said reveal member to cover said perimeter portion of said reveal member.

18. An aircraft comprising:
- a fuselage having a window opening;
- an interior decorative panel within said fuselage, and having a panel opening for receiving a window assembly therein;
- a window assembly disposed within said panel opening in said interior decorative panel, said window assembly including:
  - a reveal member having a perimeter portion with an integrally formed, enlarged lip portion, the perimeter portion further defining a window opening; and
  - a plurality of at least three resilient flanges non-removably secured on said perimeter portion and spaced apart from one another on said perimeter portion, each one of said flanges forming an associated channel in cooperation with said enlarged lip portion, and operable to tensionably engage with an outwardly angled edge portion of said interior decorative panel adjacent said panel opening when said reveal member is inserted into said panel opening, to hold said reveal member within said panel opening without the need for external fastening implements.

* * * * *

UNITED STATES PATENT AND TRADEMARK OFFICE
CERTIFICATE OF CORRECTION

| | | |
|---|---|---|
| PATENT NO. | : 8,123,168 B2 | |
| APPLICATION NO. | : 11/509126 | |
| DATED | : February 28, 2012 | |
| INVENTOR(S) | : Lon E. Switzer et al. | |

It is certified that error appears in the above-identified patent and that said Letters Patent is hereby corrected as shown below:

Title Page, Item (75) Inventors: "Lon E Switzer, Marysville, WA (US); Robert D Dixon, Everett, WA (US); Fred P Seibert, Seattle, WA (US); Scott Laverne, Everett, WA (US); Michael J Zizzo, Mill Creek, WA (US); Gregory W Nelson, Everett, WA (US); Gennady V Shankov, Moscow (RU); James G. Trimble, Lake Stevens, WA (US)" should be -- Lon E. Switzer, Marysville, WA (US); Robert D. Dixon, Everett, WA (US); Fred P. Siebert, Seattle, WA (US); Scott LaVerne, Everett, WA (US); Michael J. Zizzo, Mill Creek, WA (US); Gregory W. Nelson, Everett, WA (US); Gennady V. Shankov, Moscow (RU); James G. Trimble, Lake Stevens, WA (US) --

Signed and Sealed this
Twenty-fourth Day of April, 2012

David J. Kappos
*Director of the United States Patent and Trademark Office*